United States Patent
Imamoto

(10) Patent No.: US 7,125,343 B2
(45) Date of Patent: *Oct. 24, 2006

(54) IRON GOLF CLUB HEAD

(75) Inventor: Yasunori Imamoto, Tokyo (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/971,034

(22) Filed: Oct. 25, 2004

(65) Prior Publication Data

US 2005/0124437 A1 Jun. 9, 2005

(30) Foreign Application Priority Data

Dec. 5, 2003 (JP) ............................. 2003-407638

(51) Int. Cl.
 *A63B 53/04* (2006.01)
 *B29C 45/14* (2006.01)

(52) U.S. Cl. ............... 473/332; 473/345; 473/347; 473/349; 473/350

(58) Field of Classification Search ........ 473/345–346, 473/349–350, 347, 332
See application file for complete search history.

(56) References Cited

U.S. PATENT DOCUMENTS

| 4,792,139 | A | 12/1988 | Nagasaki et al. |
| 4,798,383 | A | 1/1989 | Nagasaki et al. |
| 4,928,972 | A | 5/1990 | Nakanishi et al. |
| 4,964,640 | A | 10/1990 | Nakanishi et al. |
| 5,255,913 | A | 10/1993 | Tsuchida |
| 5,711,722 | A * | 1/1998 | Miyajima et al. ........... 473/346 |
| 5,766,092 | A * | 6/1998 | Mimeur et al. ............. 473/329 |
| 2004/0266550 | A1* | 12/2004 | Gilbert et al. ............. 473/345 |
| 2005/0009626 | A1* | 1/2005 | Imamoto et al. ........... 473/338 |
| 2005/0096150 | A1* | 5/2005 | Hou et al. .................. 473/332 |

FOREIGN PATENT DOCUMENTS

| JP | 62-97570 A | 5/1987 |
| JP | 63-19169 A | 1/1988 |
| JP | 5-68725 A | 3/1993 |
| JP | 6-39941 A | 2/1994 |
| JP | 8-24377 A | 1/1996 |
| JP | 9-225076 A | 9/1997 |

* cited by examiner

*Primary Examiner*—Sebastiano Passaniti
(74) *Attorney, Agent, or Firm*—Sughrue Mion, PLLC

(57) ABSTRACT

A recess portion is provided on a rear face of a head main body. A resin layer is bonded between ribs, of an innermost face. After an element assembly of the resin layer, an element assembly of the FRP body and a balloon are inserted into the recess portion, the iron golf club head is mounted in a mold, and a gas such as air is supplied into the balloon through an air opening inserted into an opening.

10 Claims, 4 Drawing Sheets

Prior Art

IRON GOLF CLUB HEAD

BACKGROUND OF THE INVENTION

1. Field of the Invention

The present invention relate to a golf club head for batting the golf ball, and particularly to an iron golf club head. More particularly, this invention relates to an iron golf club head including a head main body having a recess (cavity) retreated from the rear face, and an FRP body provided in this recess.

2. Description of the Related Art

The iron golf club heads were conventionally made of metal material alone such as stainless steel or cast iron. In recent years, the iron golf club heads with an FRP (fiber reinforced plastic) material disposed behind the head main body are available on the market.

For example, in JP-A-62-97570, an iron club was disclosed in which a CFRP (carbon fiber reinforced plastic) layer is attached on the back face of a batting face to enhance the feeling of batting.

Also, this CFRP layer is attached on the back face of the batting face, and covered with a plastic backup member, as disclosed in JP-A-63-19169. In FIG. 5 of JP-A-63-19169, an iron golf club head is shown in which an entrance portion of cavity is closed with the backup member to make the FRP member a hollow structure.

FIG. 5 corresponds to FIG. 5 as disclosed in JP-A-63-19169. A head main body 1 of this iron club head has a recess 4 behind a batting face portion 2, and a rising portion 8 standing from the rear edge of a sole face portion 3.

A fiber reinforced member 5 is intimately affixed on the inner face of the recess 4. The fiber reinforced member 5 has a hollow shell structure. In JP-A-63-19169, there is no description how the fiber reinforced member 5 with the hollow shell structure is disposed or formed within the recess 4. The plastic material is filled into the recess 4 to cover this fiber reinforced member 5 and cured to form a backup member 6 (left upper column and left lower column at page 5 in JP-A-63-19169).

SUMMARY OF THE INVENTION

As described above, in JP-A-63-19169, there is no description how the fiber reinforced member 5 with the hollow shell structure is disposed or formed within the recess 4.

In the golf club head as disclosed in JP-A-63-19169, a gap is likely to occur between the head main body 1 and the fiber reinforced member 5. If there is such gap, irregular vibration occurs at the time of shot of batting the golf ball, aggravating the feeling of batting.

It is an object of the present invention to provide an iron golf club head having a head main body and an FRP body intimately disposed in the recess without a gap.

According to an aspect of the invention, there is provided an iron golf club head having a head main body provided with a recess portion behind a face portion; an FRP body provided in the recess portion; and a takeoff opening for a balloon provided in a toe portion or a back portion of the golf club head, wherein the FRP body has a hollow shape, and is balloon molded in the recess portion, and the opening is closed with a lid member.

The iron golf club head may have a plurality of ribs extending vertically on a back face of the face portion in the golf club head.

The iron golf club head may have a resin layer disposed between the ribs.

Preferably, the resin layer is made of at least one of an FRP and elastomer layer.

Preferably, the resin layer has a higher specific gravity than the FRP body.

Preferably, the resin layer is disposed between the head main body and the FRP body.

In the iron golf club head of the invention, the FRP body is balloon molded in the recess portion, whereby the FRP body and the head main body are intimately contacted without producing a gap between them.

According to this invention, a takeoff opening for balloon is provided in a toe portion or a back portion of the golf club head, the opening being closed with a lid member. Since this toe portion or back portion does not hit the ground at the shot, the lid member is not subjected to impact, and prevented from being peeled.

According to this invention, a plurality of ribs extend vertically on a back face of the face portion in the golf club head. Thereby, the rigidity of the face portion is increased to change the feeling of batting. When the plurality of ribs are provided, a resin layer is preferably disposed between the ribs to reduce or remove the depression between the ribs. Thereby, it is possible to resolve a gap between the FRP body superposed on the back face of the face portion and the back face of the face portion.

The resin layer may be an FRP or elastomer layer.

Also, the resin layer may be a higher specific gravity resin layer. By providing this high specific gravity resin layer, the vibration absorbing characteristic at the time of shot is improved. Also, the center of gravity is deepened to stabilize the shot. Moreover, the weight of the iron golf club head is adjusted with the high specific gravity resin layer.

BRIEF DESCRIPTION OF THE DRAWING

These and other objects and advantages of this invention will become more fully apparent from the following detailed description taken with the accompanying drawings in which.

DETAILED DESCRIPTION OF THE PREFERRED EMBODIMENTS

Figure 1:
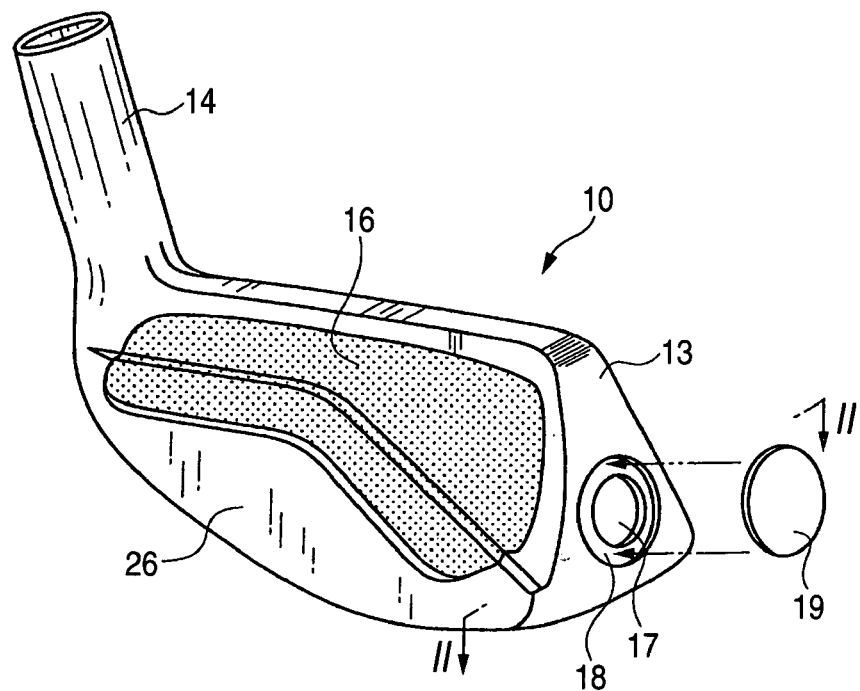
FIG. 1 is an exploded perspective view of an iron golf club head according to an embodiment of the present invention.
Figure 2:
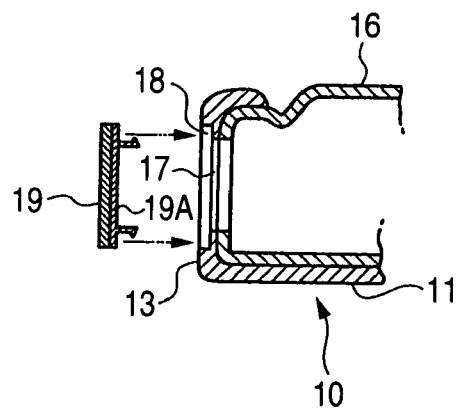
FIG. 2 is a cross-sectional view taken along the line II—II in FIG. 1.
Figure 3A:
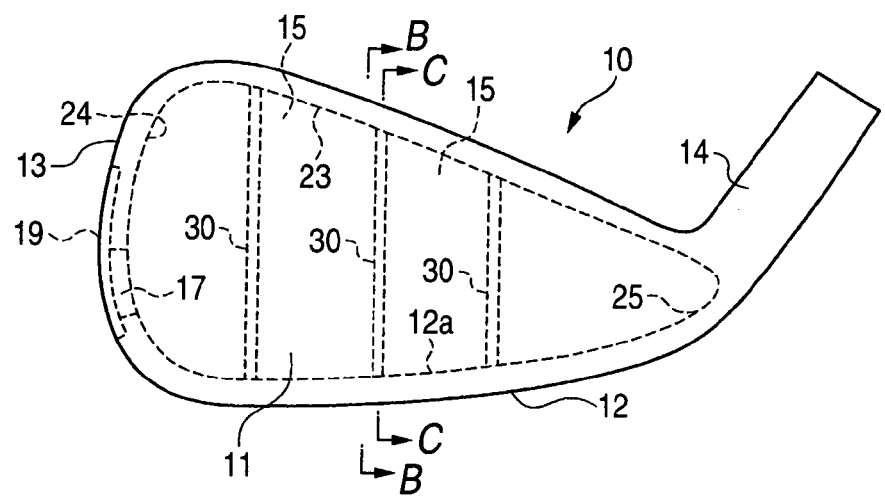
FIG. 3A is a front view of the golf club head.
Figure 3B:
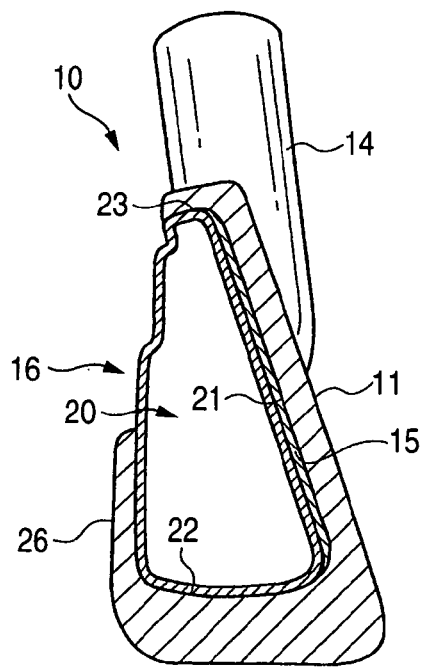
FIGS. 3B and 3C are cross-sectional views taken along the line B—B and the line C—C in FIG. 3A.
Figure 3C:
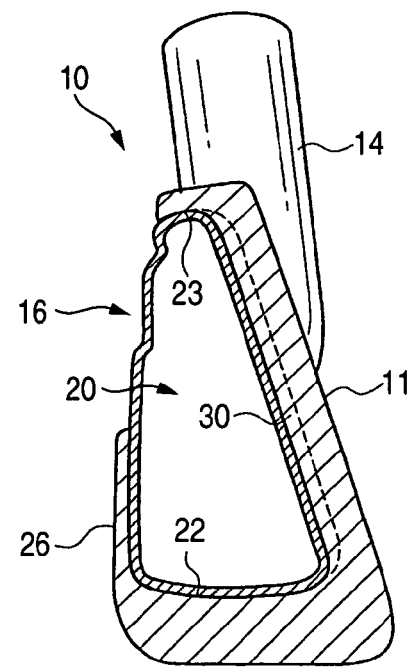
Figure 4:
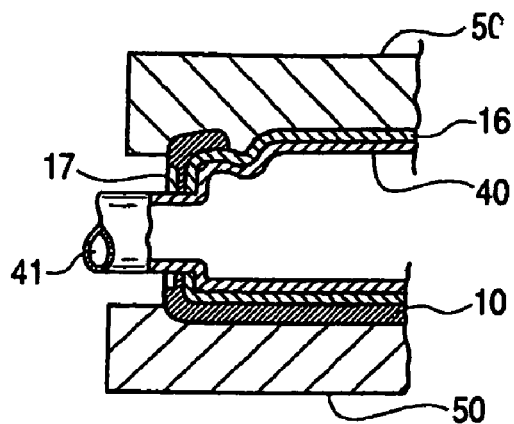
FIG. 4 is an explanatory view of balloon molding.
Figure 5:
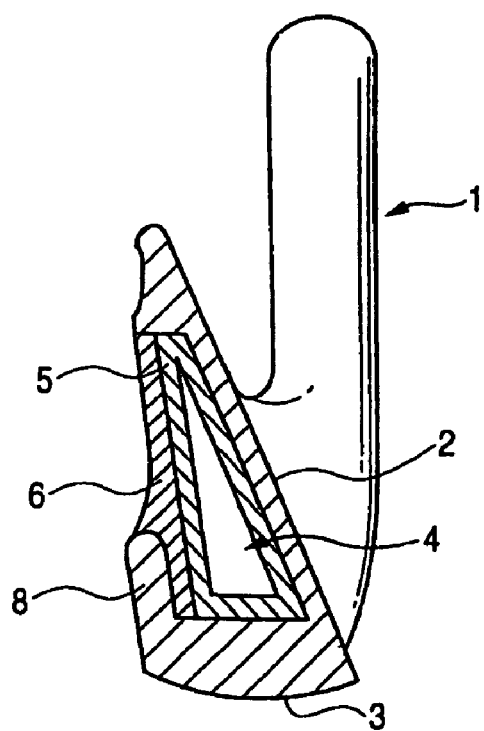
FIG. 5 is a cross-sectional view of the conventional iron golf club head.

The preferred embodiments of the present invention will be described below with reference to the accompanying drawings. FIG. 1 is an exploded perspective view of an iron golf club head according to an embodiment of the invention. FIG. 2 is a cross-sectional view taken along the line II—II in FIG. 1. FIG. 3A is a front view of the golf club head, and FIGS. 3B and 3C are longitudinal cross-sectional views of the golf club head. FIG. 4 is a cross-sectional view showing a method for molding a FRP body.

A head main body 10 of this iron golf club head has a face portion 11 for batting the ball, and a sole portion 12 to lead to the lower edge of the face portion 11. Reference numeral 13 denotes a toe portion. A shaft (not shown) is fitted into a hosel portion 14 of the head main body 10.

This head main body 10 is made of metal such as stainless. The face portion 11 may be made of titanium or titanium alloy, and the other portions may be made of stainless.

The head main body 10 has a recess portion 20 retreated from the rear face. An FRP body 16 is balloon molded within the recess portion 20.

An innermost face 21 of this recess portion 20 is a back face of the face portion 11. The circumferential wall faces of the recess portion 20 fall from the rear face of the head main body 10 to lead to the innermost face 21, and is configured with a circumferential wall face 22 on the sole side, a circumferential wall face 23 on the upper edge side, a circumferential wall face 24 on the toe side and a circumferential wall face 25 on the heel side, as shown in FIG. 3.

Each of the crossing corner portions between the circumferential wall faces 22 to 25 and the innermost face 21 is a curved face smoothly curved concave. The radius of curvature of this curved face is from 1.5 to 80 mm, preferably from 2 to 60 mm to produce no gap between the head main portion 10 and the FRP body 16 in this crossing corner portion.

The entrance side (rear face side of the head main body 10) of the recess portion 20 has a narrow shape in which a rising portion 26 is stood from the sole portion 12.

In this embodiment, three ribs 30 extending vertically are provided on the innermost face 21 (back face of the face portion 11). Each rib extends from the circumferential wall face 23 on the upper edge side to the circumferential wall face 22 on the sole side. By providing the ribs 30, the golf club head can produce a higher feeling of batting.

A resin layer 15 is disposed between the ribs 30.

The thickness of the resin layer 15 is equivalent to the height of the rib 30. Thereby, a depressed area between the ribs 30 is embedded with the resin layer 15, and substantially flat from the rib 30 on the toe side to the rib 30 on the heel side.

The resin layer 15 may be made of FRP, an elastomer having elasticity, or a high specific gravity resin. This high specific gravity resin layer is preferably made of a resin material, such as epoxy, nylon, polyester, urethane, ABS, or thermoplastic elastomer, to which a high specific gravity metal powder having a specific gravity of 10 or more such as tungsten or tungsten alloy is blended. The specific gravity of this high specific gravity resin layer is from about 10 to 17, preferably from about 10 to 14. The high specific gravity resin may be reinforced with carbon fiber or metallic fiber.

By providing the resin layer 15, it is possible to prevent a gap between the FRP body 16 and the back face of the face portion from arising. Also, this resin layer 15 absorbs the vibration at the time of shot, and facilitates the adjustment of the weight of the iron golf club head, when it is the high specific gravity resin.

The FRP body 16 is provided along the inner face of the recess portion 20. This FRP body 16 has a hollow shell structure of covering the resin layer 15, and the circumferential wall faces 22 to 25, and closing the entrance portion of the recess portion 20. On the rear face of the head main body 10, the FRP body 16 is almost flush with the rear face of the head main body.

This FRP body 16 is balloon molded within the recess portion 20. An opening 17 for taking out a balloon for the balloon molding is provided in the toe portion 13 of the head main body 10. A concave step portion 18 is provided around the opening 17. A lid member 19 is fitted with the concave step portion 18 to close the opening 17. The lid member 19 is fixed to the head main body 10 by adhesive, glue, double coated tape or brazing, for example. A pawl may be provided in the lid member 19 and engaged at the back edge of the opening 17, as shown. In this embodiment, the pawl is provided a backing member 19A of the lid member 19.

To make the balloon molding, first of all, a sheet-like element assembly of the resin layer 15 is inserted between the ribs 30, 30, and superposed on the innermost face 21. This sheet-like element assembly may be one piece, but suitably a laminate composed of a plurality of thin films. The laminate composed of the plurality of thin films is likely to deform flexibly, and easily conform with the inner face of the recess portion 20.

Then, the element assembly of the FRP body 16 is inserted into the recess portion 20. The element assembly of this FRP body 16 is composed of a plurality of pieces, each piece being superposed on the element assembly of the high specific gravity resin layer 15 or the circumferential wall faces 22 to 25. After a nylon bag (balloon) 40 is placed through the opening 17, the element assembly of the FRP body 16 is disposed in the entrance portion of the recess portion 20. As shown in FIG. 4, an air opening 41 for the balloon 40 is pulled outside through the opening 17.

The element assembly of the FRP body 16 is made of uncured fiber reinforced plastic. The fiber is suitably carbon fiber, but not limited thereto. The element assembly is suitably a prepreg sheet, especially unidirectional prepreg sheet with the fiber directed in one way, but not limited thereto. For a portion constituting the rear face of the FRP body 16, it is preferable that a woven fabric of carbon fiber cloth on the outermost layer is disposed so that a net pattern may appear on the rear face of the FRP body 16.

After the element assembly of the FRP body 16 and the bag (balloon) 40 are disposed within the recess portion 20, the iron golf club head 10 is mounted in a mold 50 for balloon molding, a gas such as air is supplied into the bag 40 to be inflated. Thereby, the element assembly of the resin layer 15 is pressed onto the innermost face 21, and the element assembly of the FRP body 16 is intimately contacted with the element assembly of the resin layer 15, the circumferential wall faces 22 to 25 and the inner face of the mold. Then, the mold is heated to harden each element assembly. Thereafter, the mold is released. After releasing the mold, the bag 40 is extracted through the opening 17, and the lid member 19 is fixed on the step portion 18 to close the opening 17.

By this balloon molding (blow molding with the bag), the iron golf club head is produced in which the resin layer 15 and the FRP body 16 are intimately contacted in the crossing corner portion between the innermost face 21 and the circumferential wall faces 22 to 25.

In the iron golf club head constituted in this manner, the FRP body 16 is intimately contacted with the inner face of the head main body 10, whereby the feeling of batting is excellent. Since the lid member 19 is disposed in the toe portion, the lid member 19 does not contact the ground at the time of shot. Therefore, the lid member 19 is not peeled, and the head has a superior durability.

Figure 6:
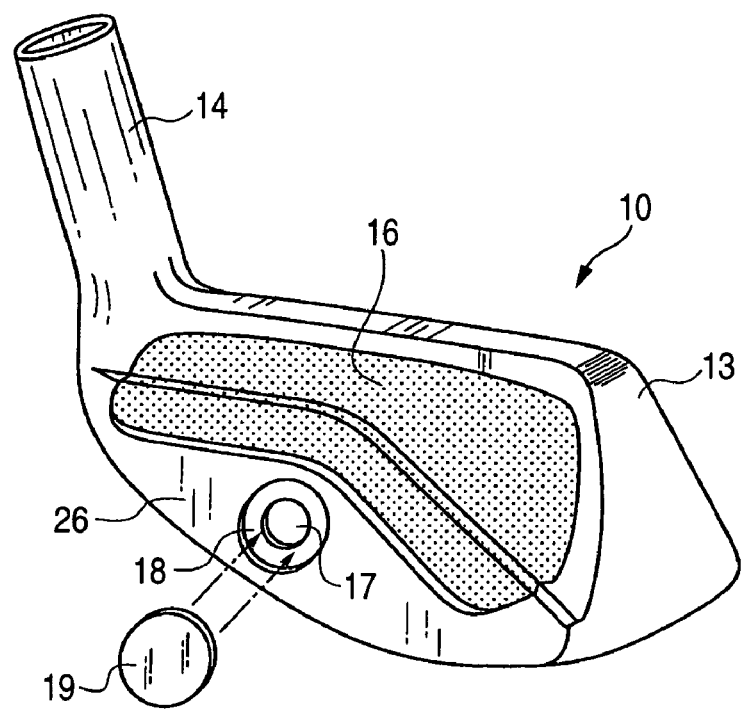
FIG. 6 is a perspective view of a golf club head according to another embodiment of the invention.

In the embodiments, the opening 17 is provided in the toe portion, but may be provided in the back portion, as shown in FIG. 6.

Figure 7:
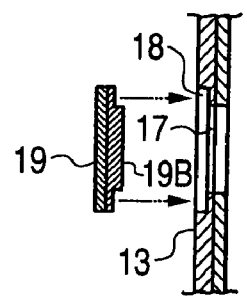
FIG. 7 is a cross-sectional view showing another structure for mounting the lid member.

Also, an elastic body 19B made of rubber or elastomer may be fixed on the back face of the lid member 19, and fitted into the opening 17 or the step portion 18, thereby securing the lid member 19, as shown in FIG. 7. In this manner, the elastic body 19B exhibits the effect of absorbing the vibration.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An iron golf club head comprising:
    a main body provided with a recess portion behind a face portion;
    an FRP body provided in the recess portion; and
    an opening provided in a side wall at a toe portion or a back portion of the golf club head, wherein
    the FRP body has a hollow shape that is substantially enclosed, and is balloon molded in the recess portion, and
    the opening is closed with a lid member.

2. The iron golf club head according to claim 1, further comprising a plurality of ribs extending vertically on a back face of the face portion.

3. The iron golf club head according to claim 2, further comprising a resin layer disposed between the ribs.

4. The iron golf club head according to claim 3, wherein the resin layer is made of at least one of an FRP and elastomer layer.

5. The iron golf club head according to claim 3, wherein the resin layer has a higher specific gravity than the FRP body.

6. The iron golf club head according to claim 4, wherein the resin layer has a higher specific gravity than the FRP body.

7. The iron golf club head according to claim 3, wherein the resin layer is disposed between the main body and the FRP body.

8. The iron golf club head according to claim 4, wherein the resin layer is disposed between the main body and the FRP body.

9. The iron golf club head according to claim 5, wherein the resin layer is disposed between the main body and the FRP body.

10. The iron golf club head according to claim 6, wherein the resin layer is disposed between the main body and the FRP body.

* * * * *